May 21, 1935.    R. C. ANGELL ET AL    2,002,479
MANUFACTURE OF FLEXIBLE SHAFTING
Filed Aug. 20, 1931    9 Sheets-Sheet 1
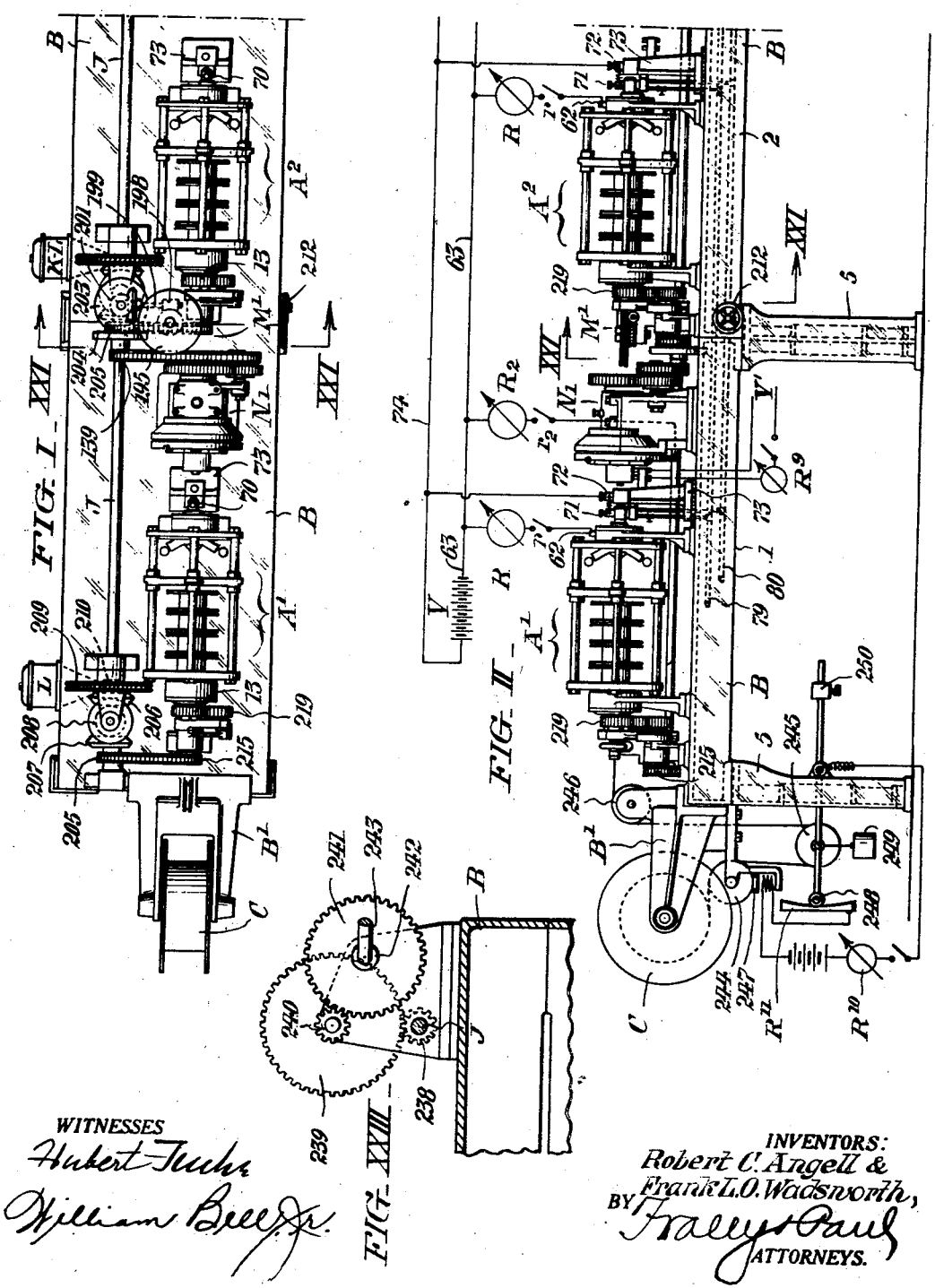

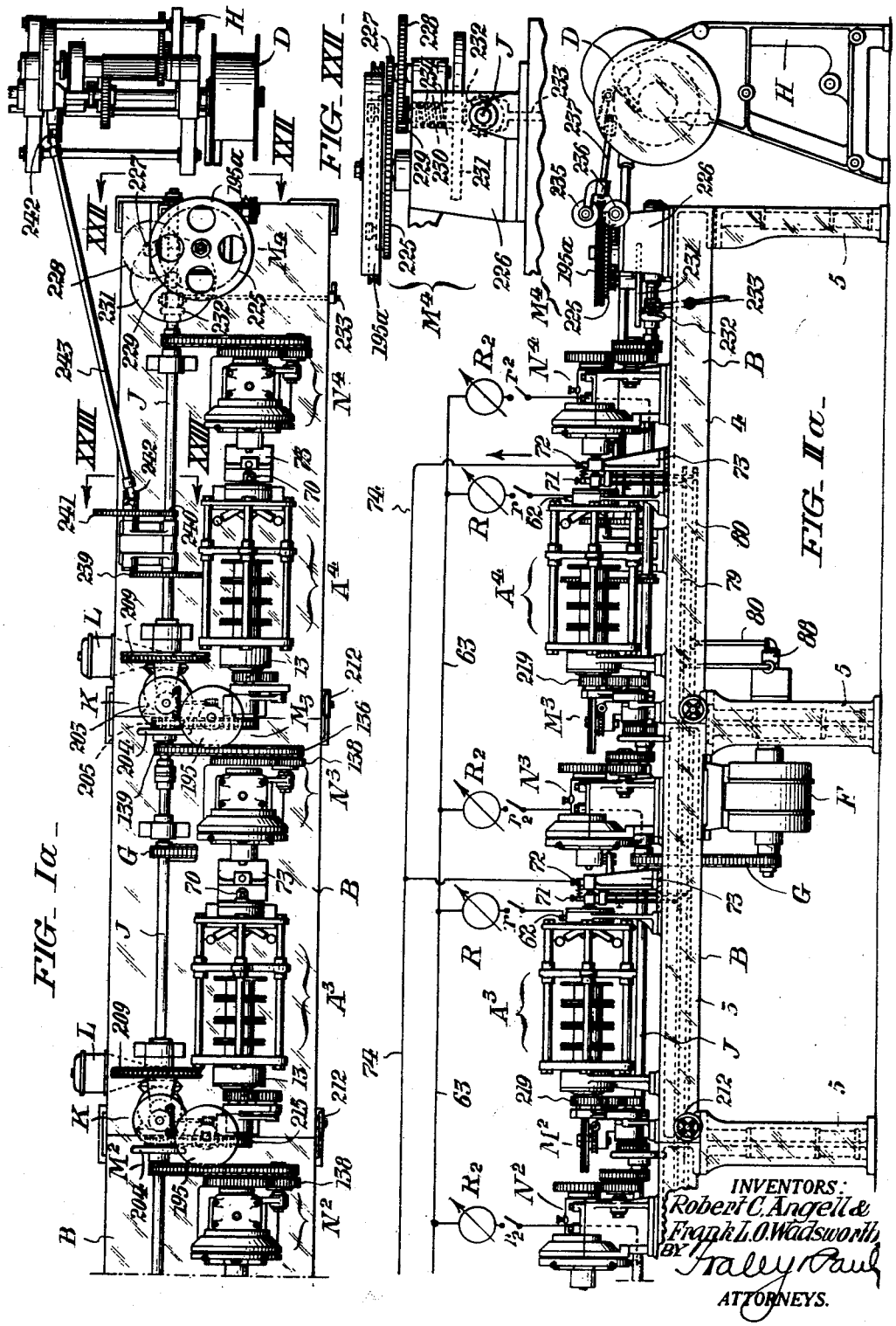

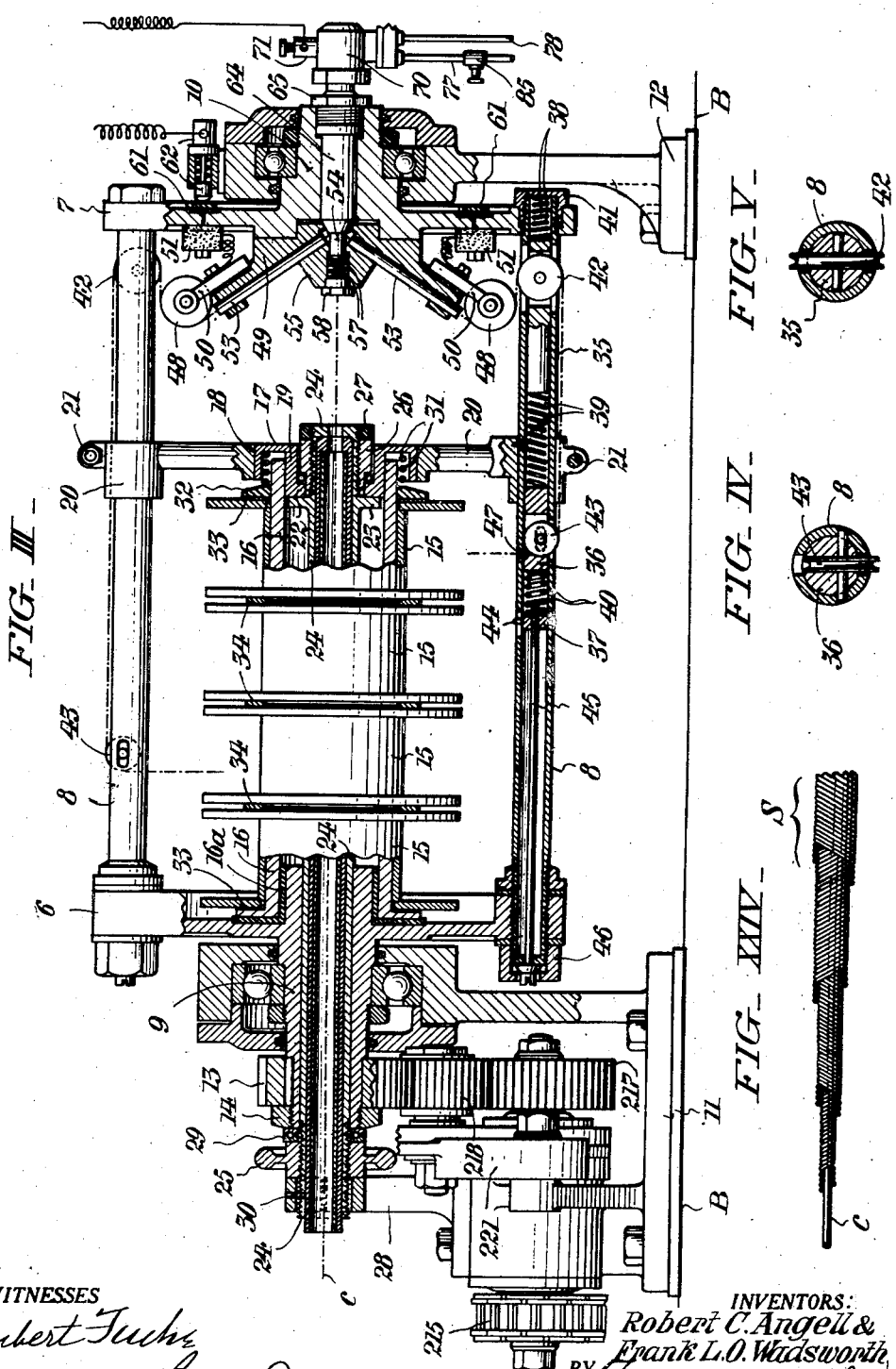

May 21, 1935.  R. C. ANGELL ET AL  2,002,479
MANUFACTURE OF FLEXIBLE SHAFTING
Filed Aug. 20, 1931   9 Sheets—Sheet 4
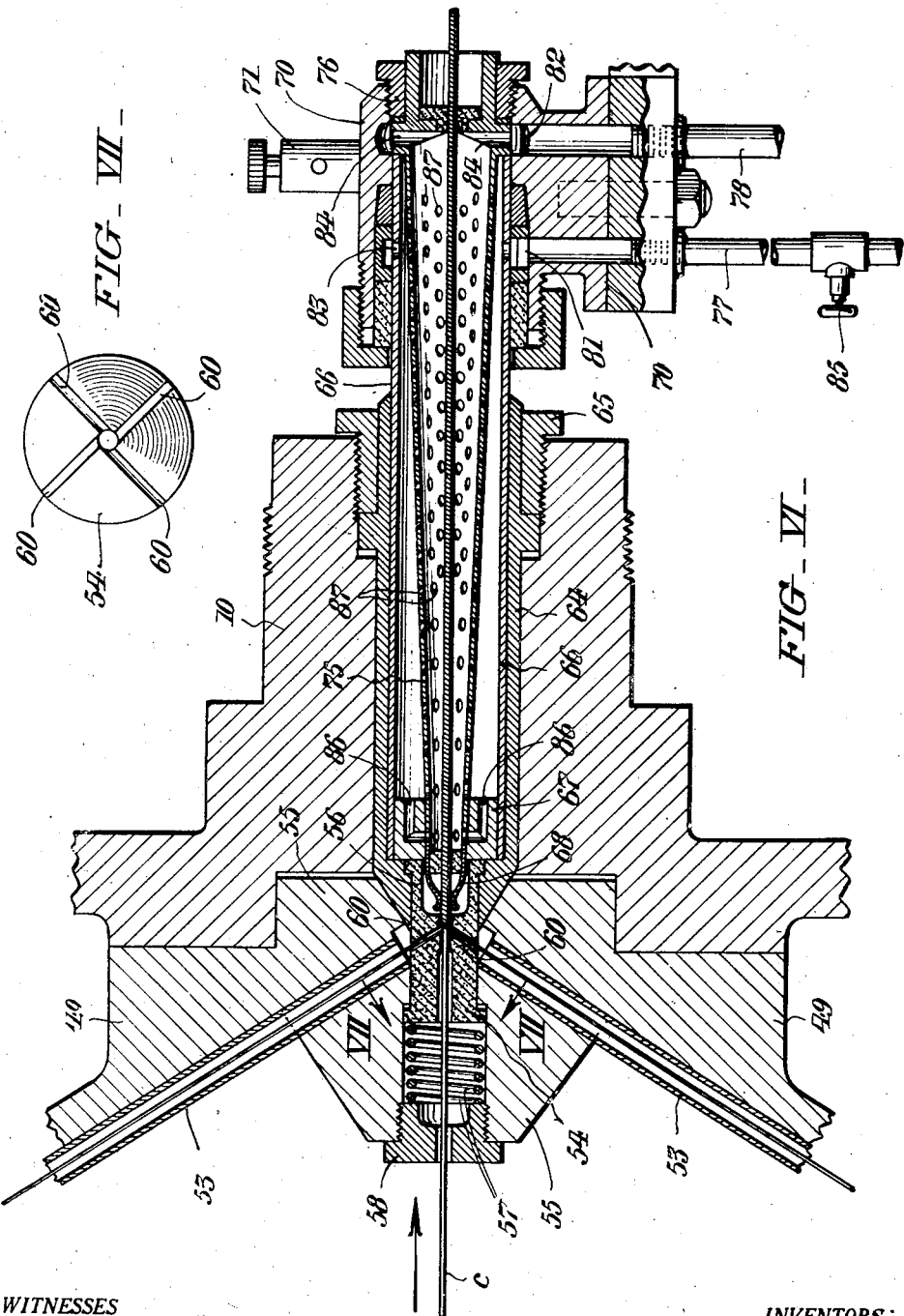
WITNESSES
INVENTORS:
Robert C. Angell &
Frank L. O. Wadsworth
BY
ATTORNEYS.

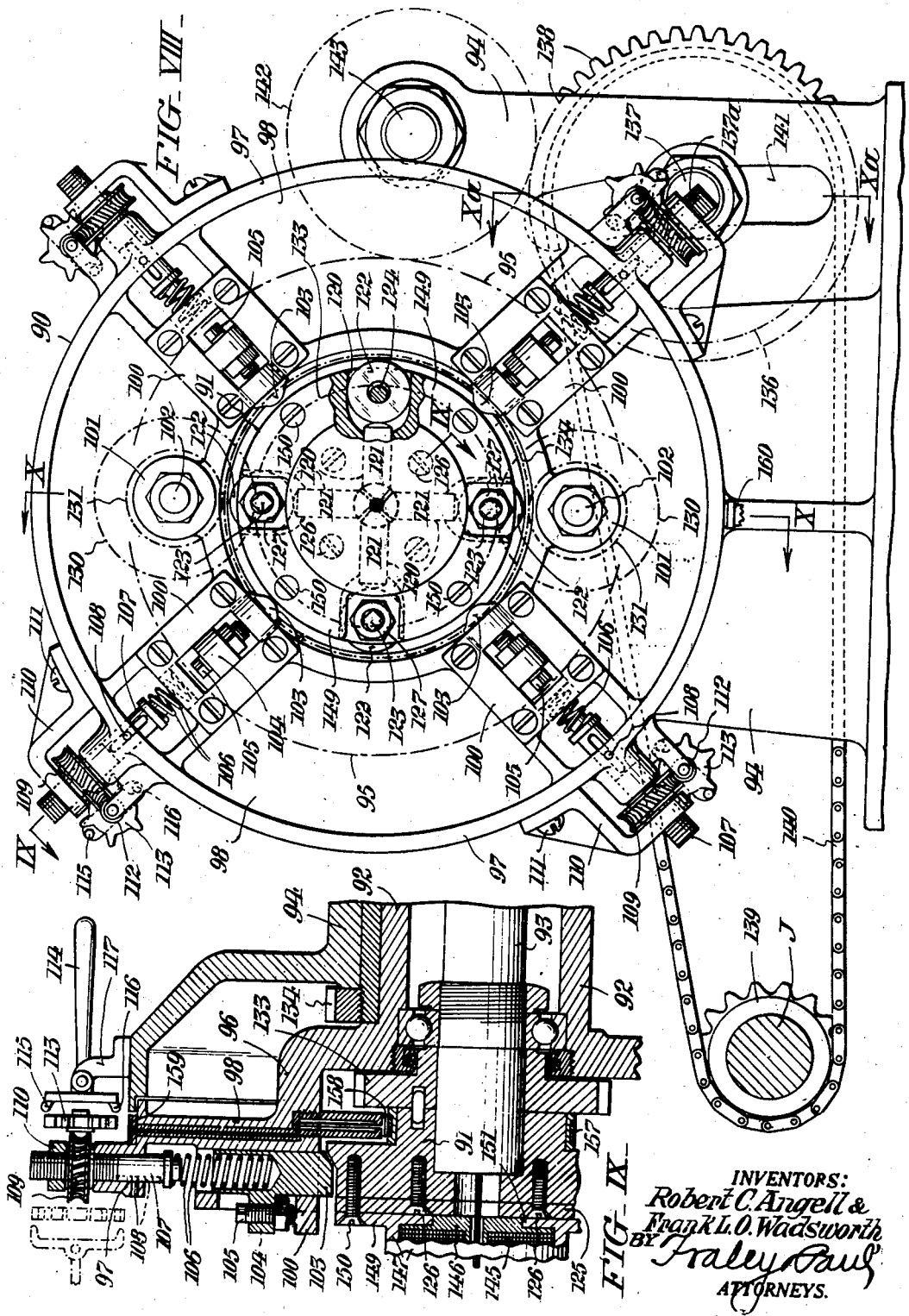

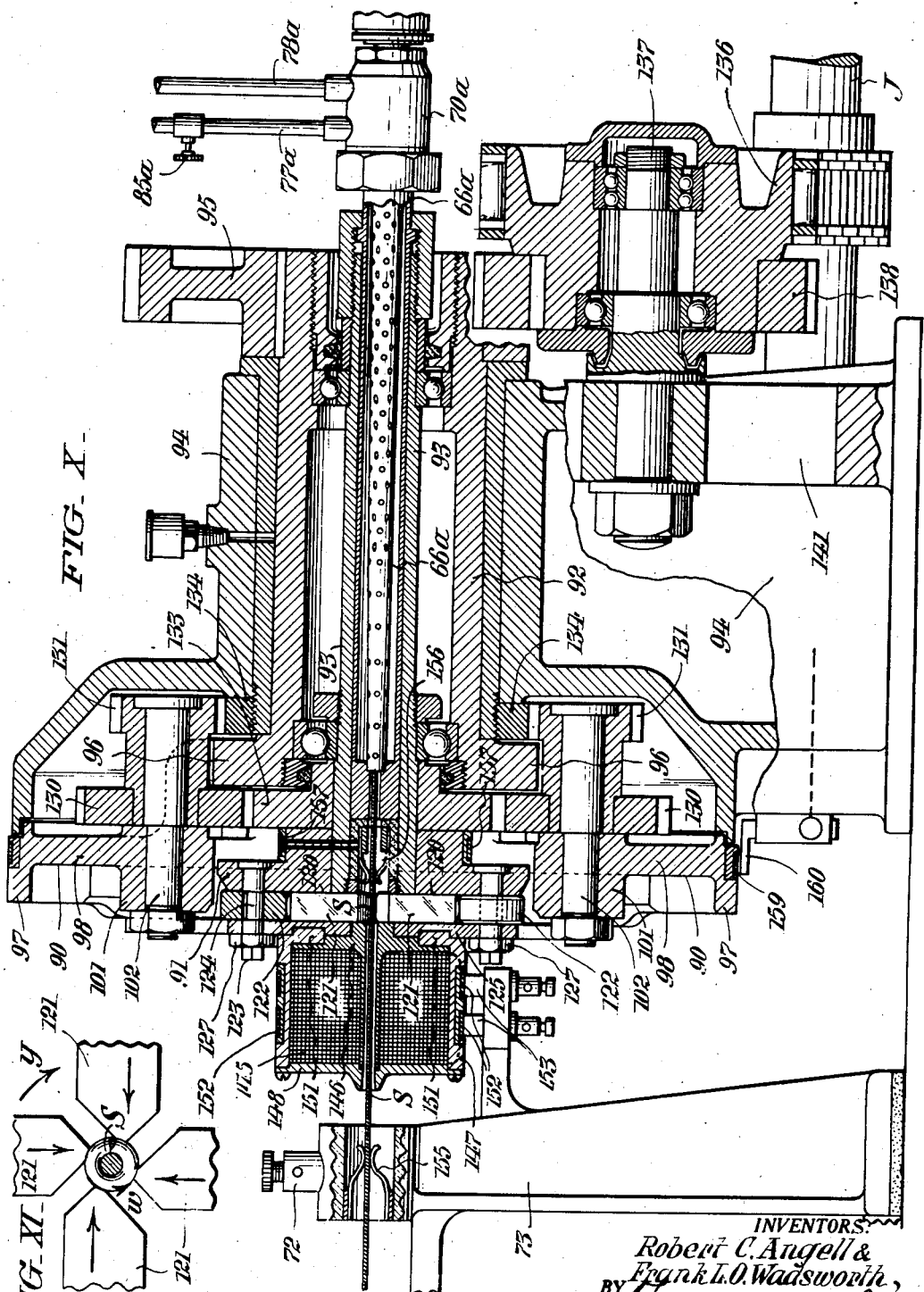

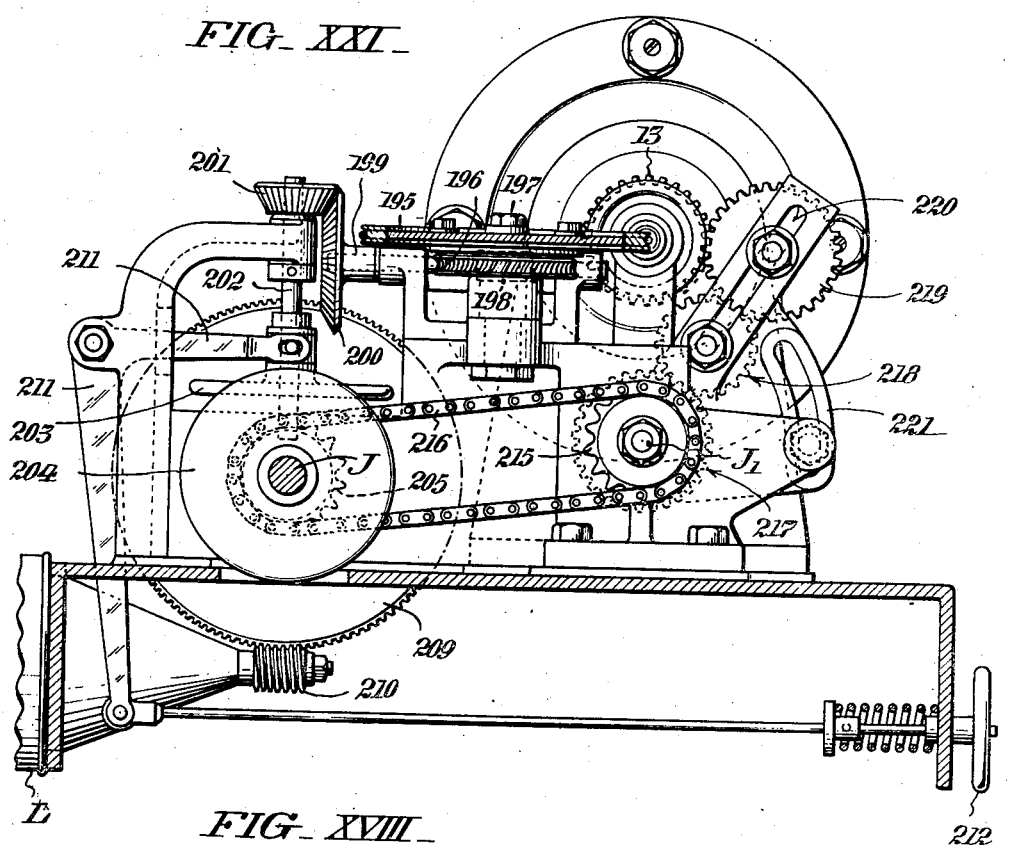
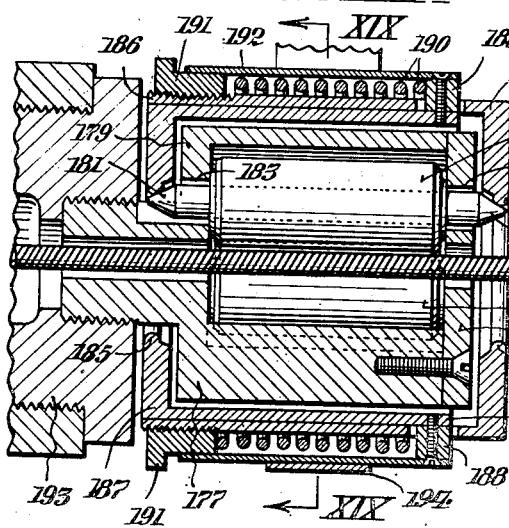

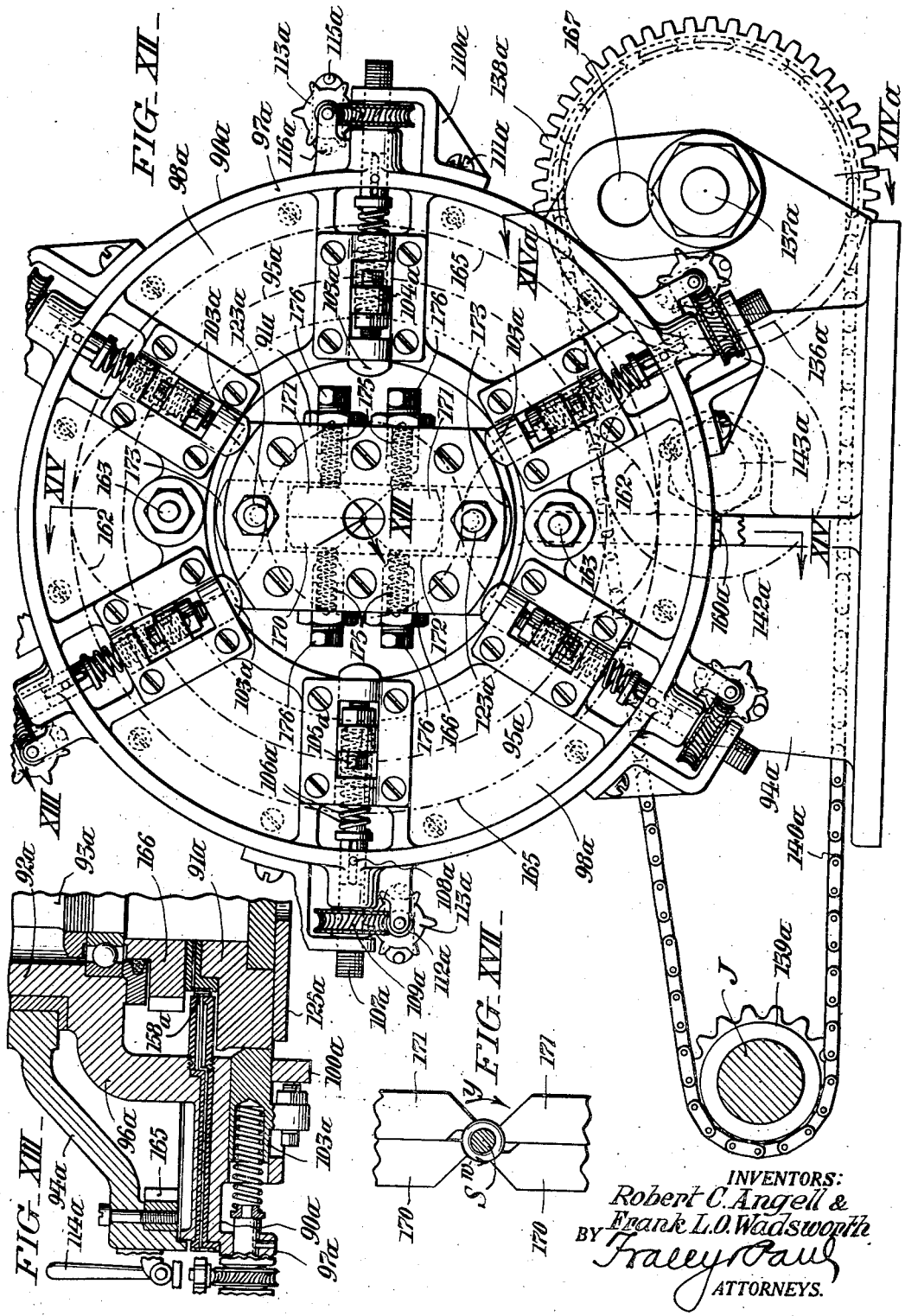

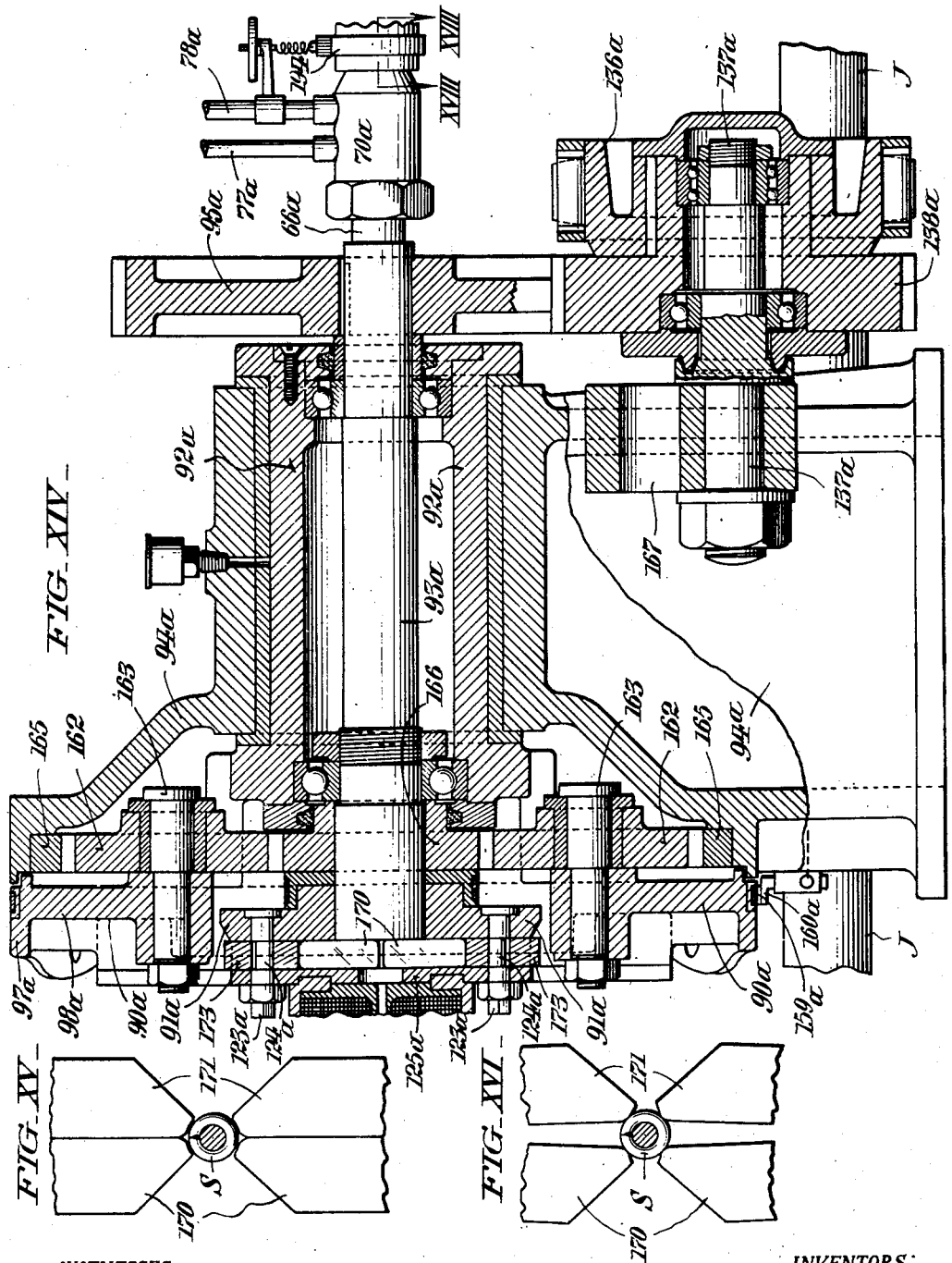

Patented May 21, 1935

2,002,479

UNITED STATES PATENT OFFICE 2,002,479

MANUFACTURE OF FLEXIBLE SHAFTING

Robert C. Angell, Prince Bay, N. Y., and Frank L. O. Wadsworth, Pittsburgh, Pa., assignors to The S. S. White Dental Manufacturing Company, a corporation of Pennsylvania Application August 20, 1931, Serial No. 558,340

13 Claims. (Cl. 29—148)

Our invention relates to the fabrication of a flexible shaft, which comprises a core body and one or more layers of strand wire coiled thereon, and, which, when so fabricated, can be used, in a bent or curved condition, to transmit power, without any undue or detrimental internal friction or loss of efficiency; and which will also be free from any substantial or objectionable amount of unrelieved or unbalanced stress or strain, that would tend to make the fabricated body kink or curl when cut up into short lengths, or to "whip" or "kick" when rotated on its axis. We attain this object by subjecting each coiled layer of strand wire, after it has been wound, and before another layer has been superimposed thereon, to a mechanical working, which has the effect of not only reducing the initial pressure engagement, or localized contact, between the said layer and the underbody upon which it is wound—and thereby permitting of relatively free movement between the contiguous shaft elements—but of also relieving the fibers or grains of the tightly coiled and elastically distorted material from such irregular or unequalized stresses and strains as may be imposed upon it during the winding operation; and which has the further effect of "setting", or fixing, these fibers or grains in their freed and equilibriated position;—thereby eliminating, or greatly reducing, the tendency of such residual distortions and stresses to produce a twisting and partial uncoiling of the helical windings when the end restraint thereon is removed.

More specifically stated the purpose of our present improvements is to obtain the results above described, by subjecting a material portion of the outermost particles or fibers of each successively wound layer of strand wire to a combined peening, planishing and rubbing, or rolling action, which is obtained by the use of a new type of high speed multi-die swaging and rolling mechanism, that is adapted to exert a great multiplicity of very rapidly recurrent impact and compression stresses, on substantially every point of the contacting surfaces of the superimposed helical coils, (where the fibers of the metal have been most severely stressed by the bending of the wire around the core body), as the partially formed shafting is progressed through the fabricating mechanism;—these operations of winding each strand layer, and of then subjecting said layer to this mechanical treatment, being carried on concurrently and continuously as the fabrication proceeds.

Another object of this invention is to provide a method for subjecting each successive layer of strand wire elements to the combined effects of a heat treatment and of a mechanical working, (of the character above described), prior to the formation of the next, or superjacent, layer; and we accomplish this, preferably, by passing an electric current through each group of strand wires either prior, or subsequent, to the winding operation, by which they are applied to the core or underbody; thereby improving or increasing the cooperative beneficial results of the concurrent heating, swaging and rolling actions. In conjunction with these mechanical, and thermo-mechanical treatments of each individual layer of strand wires—either or both of which may be used at the option of the machine attendant—we further provide for also subjecting the material to an electro-magnetic treatment, which can be applied, whenever desired, by creating an intense magnetic field, preferably alternating in character, in the zone or region of mechanical working.

An additional purpose of these improvements is to reduce the tension that must be applied to the strand wires, in order to coil them around, and draw them down upon, the underlying core body of the shafting. Winding the strand wire at high tension is objectionable both because of the excessive stresses and strains to which the strand wire is subjected and because of the reaction of this high tension upon the core body which creates objectionable effects which persist in the finished structure, and also because the lowering of this tension decreases the initial pressure contact between the two engaged elements. It is accordingly very desirable to reduce the tension at which the strand wires are wound. The contraction of the hot coil upon the core will necessarily somewhat increase the pressure contact so that it is the more desirable that it be initially as low as possible. Winding the strand wires while hot also decreases the strains and stresses which are imposed thereon by the bending and coiling action. The forces required to effect this action are proportional to the lateral stiffness, or transverse strength, of the strand wires; and since this is less at high temperatures than it is at low temperatures, we provide means for heating the strand wire elements—for a short distance back of the point where they are wound upon the core body—to a controllable predetermined temperature which is sufficiently high to substantially reduce their transverse stiffness, but not high enough to detrimentally affect, or permanently injure, their elastic characteristics. As a collateral object of this feature of our invention, we also provide self controlled and automatically acting instrumentalities for establishing and maintaining a uniform predetermined tension on the heated portion of each individual strand wire; and further provide other manually actuated means—operable while the winding operation is in progress—for simultaneously varying the tension on all of the strand wires in each layer.

Still another object of our present invention is to make provision for a special tempering treatment of each layer of hot strand wires immediately after it has been laid on the underbody, for the purpose of not only equalizing temperature effects in the juxtaposed elements of the partially fabricated shafting before they are subjected to either the mechanical, or the thermo-mechanical, or the electro-magnetic-mechanical actions above described (or any two or all of them conjointly), but of also imparting to the strand wire material physical properties of characteristics which may render it more susceptible, or better adapted, to benefit from the succeeding operations.

Other objects and purposes of our improved mode of procedure; and other advantages of the various mechanisms which we provide for the practice of our invention, will more fully appear from the following description of several illustrative embodiments of our improvements. In the drawings which form a part of this description:

Figs. I and Ia, taken together, present a general plan view of a multi-stage machine for fabricating four-layer flexible shafting; and Figs. II and IIa, taken as one, is a front elevation of this machine;

Fig. III is an enlarged longitudinal section—partly in elevation—of one of the winding head units of our apparatus; and Figs. IV and V are sectional views of certain details of this apparatus;

Fig. VI is another longitudinal section, on a still larger scale, of a portion of the construction shown in Fig. III; and Fig. VII is an end view—looking in the direction of the arrows VII—VII of Fig. VI—of one of the structural elements thereof;

Fig. VIII is an end elevation of one of the accessory swaging and treating units of our improved organization; Fig. IX is a partial longitudinal section—on the plane IX—IX of Fig. VIII—and Fig. X is a composite longitudinal section—as viewed in part on the plane X—X and in part on the plane Xa—Xa of Fig. VIII—of one of these same units;

Fig. XI is a greatly enlarged cross sectional view showing the manner in which the hammer dies of this swaging unit engage the surface of the shafting;

Fig. XII is an end view of an alternate form of swaging and treating mechanism which embodies certain features of our improvements; and Figs. XIII and XIV are longitudinal sectional views (similar to those shown in Figs. IX and X) on the respective planes XIII—XIII and XIV—XIV, XIVa—XIVa of Fig. XII;

Figs. XV, XVI and XVII are greatly enlarged diagrammatic views showing the action of the hammer dies of the mechanism, illustrated in Figs. XII, XIII and XIV;

Fig. XVIII is an enlarged sectional plan view—on the plane XVIII—XVIII of Fig. XIV—of an accessory rolling and recoil mechanism which may be used in conjunction with either one of the two swaging units illustrated in Figs. VIII to XVII inclusive; Fig. XIX is a cross section—on the plane XIX—XIX of Fig. XVIII—of this accessory device; and Fig. XX is a greatly enlarged diagrammatic view indicating the recoil action thereof;

Fig. XXI is an end elevation, partly in section, of one of the several intermediate draft units—as viewed from the plane XXI—XXI of Figs. I and II—and also illustrates one of the trains of driving mechanism which actuate each winding head member of the apparatus; and Fig. XXII is an enlarged end elevation of the terminal draft unit—as viewed in the direction of the arrows XXII—XXII or Fig. Ia—of the organization; and Fig. XXIII is an end view—as viewed from the plane XXIII—XXIII of Fig. Ia—of a portion of the driving train for actuating the take-up or spooling reel of the apparatus.

Fig. XXIV is a general view of the successive layers of the flexible shafting as produced by the machine.

The apparatus shown in Figs. I to IIa, inclusive, is adapted to continuously fabricate multi-layer flexible shafting, by concurrently winding four groups or sets of strand wires, in successively superimposed order, about a central core body, as the latter is progressed through the machine, and then treating each progressively wound layer in such manner as to relieve the initial pressure contact between it and the underbody—and to also remove or relieve the internal stresses induced in the material by the winding operation, before the next layer is applied thereto;—the apparatus being designed to permit this treatment to be widely varied, both in nature and degree, for the purpose of most effectively handling different materials, and producing various kinds of shafting, to meet particular requirements.

Generally stated the complete apparatus comprises; a rectangular bed frame B—which is made up of four sections, 1, 2, 3, 4, that are bolted together end to end, and are supported, at suitable intervals on floor pedestals 5, 5, 5, etc.;—a core reel C, which is revolvably mounted on a bracket $B^1$ at one end of the bed B; a set of four winding units, $A^1$, $A^2$, $A^3$ and $A^4$, each mounted near one end of the correspondingly numbered bed sections (1, 2, 3, 4); a cooperative set of swaging units $N^1$, $N^2$, $N^3$ and $N^4$, each of which is supported on the opposite end of one of these bed sections; an equal number of draft units, $M^1$, $M^2$, $M^3$ and $M^4$, each positioned at the exit end of the correspondingly designated swaging unit ($N^1$, $N^2$, $N^3$, $N^4$); a jack shaft J, that extends the entire length of the bed B and which serves to drive all of the successively arranged unit groups, $A^1$—$N^1$—$M^1$, $A^2$—$N^2$—$M^2$, $A^3$—$N^3$—$M^3$, and $A^4$—$N^4$—$M^4$; a motor, F, which is mounted below the bed of the machine (on the section 3), and is coupled to the jack shaft J through the medium of a silent chain connection G; and a take-up spool D, which is preferably mounted on a separate floor stand H, at the front or delivery end of the apparatus. This arrangement of parts makes it possible to easily insert any additional number of bed sections—(each carrying a set of three units $A^x$—$N^x$—$M^x$)—between the two end sections, 1 and 4, and thus adapt the machine to the fabrication of flexible shafting with any desired number of superimposed strand wire layers.

As shown more in detail in Figs. III, IV, V, VI and VII, each of the winding units, (A¹, A² etc.), comprises a drum shaped frame, which is made up of two end heads 6 and 7, that are tied together with four rods or bars 8, 8, 8, 8, and are provided with extension trunnions 9 and 10, that are rotatably mounted in the pedestals 11 and 12 on the bed B. The trunnion 9 is provided at its rear end with a spur wheel 13, which is detachably secured thereto by a key and lock nut 14, and which is driven from the jack shaft J by an adjustable train of gearing, which will be later described in conjunction with the associated mechanism for operating the corresponding draft units (M¹, M² etc.).

The bobbins 15, 15, 15, 15, which carry the supply of strand wire for forming each helical layer, are rotatably mounted on a sleeve 16, whose rear end is supported, in an insulating bushing 16a, on the hub of the rear head 6, and whose front end is slidably engaged by the inner flange 19 of a U-shaped collar 17. The outer flange 18 of this collar is in turn supported by the hub of an intermediate spider 20, which is slidably mounted on the rods 8, 8, 8, 8, and which can be secured in any desired position thereon by the clamp bolts 21—21, etc. The inner flange 19 of the collar 17 is provided at its rear end with an inturned annular lip, 22, that is rotatably engaged with the enlarged head 23 of a hollow tube, 24, which extends rearwardly through the trunnion bearing of the head 6, and which is engaged at its rear end with a threaded hand wheel 25. The lip 22 of the collar 17 is detachably held in engagement with the head 23 by means of the threaded retaining collar and lock nut elements 26—27;—the arrangement being such as to retain the collar 17 in axially fixed position with respect to the tube 24, but permit free relative rotary movement of these two parts. The threaded hand wheel 25 is held against axial movement between the end of a retaining bracket 28, that is supported on the rear pedestal 11, and an end thrust ball race 29 that bears against the adjacent extremity of the trunnion 9. The tube 24 slides freely through the openings in these parts 28—29, but is prevented from rotating therein by the pin 30, that engages with the slotted end of the tube; so that the turning of the wheel 25 will move the member 24—together with the collar 17—axially of the winding head frame. A compression spring 31 is inserted in the annular recess between the flanges 18 and 19 of the collar 17, and is engaged at its rear end with a disc 32, which serves to press the four bobbins 15, 15, 15, 15,—and the interposed friction washers 33, 34 * * * 34, 33— against the opposite flanged end of the sleeve 16; and the axial movement of the members 17 and 24 increases or decreases the tension of the spring 31, and correspondingly alters the pressure engagement between the washer elements 34—(which are free to move axially on the sleeve 16 but are prevented from rotation thereon by the usual keyway and spline connections)—and the ends of the bobbins, and thus varies the frictional resistance to rotation of the latter on their sleeve support. This arrangement permits of the concurrent adjustment of the tension on all of the strand wires, as they are drawn from the bobbins, without stopping the machine.

In this construction each of the tie rods 8 is a hollow tube, which is adapted to slidably receive three plungers, 35, 36 and 37, and a corresponding set of three compression springs 38, 39 and 40, that are interposed respectively, one between the terminal nut 41 (that clamps the front end of the tie rod 8 to the front head 7 of the winding frame) and the plunger 35; another between the rear end of the plunger 35 and the adjacent front end of the plunger 36; and the third between the rear end of the plunger 36 and the adjacent forward end of the plunger 37. The plunger 35 is slotted at an intermediate point in its length to receive and rotatably support a tension roller 42; and the adjacent portion of the tube 8 is correspondingly slotted to receive the edges of this roller, and at the same time prevent the plunger 35 from rotating in the tube. The plunger 36 is likewise slotted at a point between its ends to embrace a second tension roll 43, whose shaft is rotatably mounted in the walls of the tube 8. The slotted portion of the plunger 36 is provided with slightly enlarged openings through which the shaft of the roll 43 passes freely; and the rear end of the slot in this plunger is shaped to closely embrace the periphery of this roll. The rear plunger 37 is prevented from rotation in the tube support, 8, by means of a pin 44; but it can be moved axially in this member by means of a cap screw 45 which is threaded into the plunger, and whose head projects through the sleeve nut, 46, that clamps the rear end of the tie rod 8 in the winding head 6. All of the tie rods 8, 8, 8, etc., are provided with a set of plungers, springs, and tension rolls, such as have just been described;—and each of the tension rolls 43 is so positioned in the supporting tie rod as to be adapted to receive a strand wire from one of the four strand wire bobbins.

The wire from each bobbin is passed through a countersunk orifice 47, in the inner side of the tie rod 8 and then out, between the plunger 36 and the tension roll 43, to the roll 42; from which it is, in turn, carried to a third roll 48, which is pivotally supported on a flanged collar, 49, that is detachably secured to the front head 7 of the winding drum. The strand wire then passes from the roll 48, through an inclined guard tube 53, to a guide nose, 54, that is centrally mounted in the hub 55 of the collar 49. This guide nose 54 is made of agate, or some other hard-non-conducting material, and is provided with a conical end, whose angular inclination to the axis of revolution is the supplement of the angle at which the strand wires are to be wound; and which is held in pressure engagement with a complementary nose piece 56 by means of the spring 57 and the retaining nut 58. The coned face of the guide nose 54 is provided with four radially disposed slots 60, 60, 60, 60, whose inner ends are substantially tangent to the surface of the core wire on which the strand wires are being laid, and whose width and depth are both slightly greater than the diameter of these strand wires. The guide orifice in the nose piece 54 is a few thousandths of an inch larger than the core body, c, and the corresponding opening in the cooperating member 56 is just large enough to allow the composite core and helical winding to slide easily therethrough. This guide nose construction enables us to accurately guide each strand wire up to the point where it is wound upon the core, and to mechanically maintain all portions of the core and strand wire elements in correctly spaced relationship, during the winding operation, without imposing any material frictional drag on the progressive movement of these elements during that operation.

The structural and operative features of the above described combination of strand wire and core wire guide mechanisms are of particular advantage in conjunction with that part of our present improvements which contemplates, and provides for, the winding of the strand wires while they are in a heated condition. In order to accomplish this object the pivot shaft blocks, 50—50, etc., which carry the guide rolls 48—48, etc., are insulated from the supporting collar 49, and are electrically connected (through the individual resistance cells 51—51) to an insulated collector ring 61, that is secured to the head 7, and is engaged by the stationary brush 62 on the pedestal bearing 12. The front trunnion 10 is bored out to receive an insulating sleeve 64, which carries the front element of the two part nose 54—56, and which is detachably clamped in position, against the hub 55 of the collar member 49, by the hollow nut 65. The sleeve 64 also carries a metal tube 66, that is tightly engaged thereby and rotates therewith; and this tube is provided at its rear end with a head 67, on which is mounted a flexible contact brush 68 that is adapted to circumferentially engage the shaft section as it emerges from the guide orifice in the nose element 56. The front portion of the tube 66 projects beyond the outer end of the sleeve 64, and is rotatably engaged by the bearing block 70 which carries a binding post 71; and this post is flexibly connected, in turn, with an adjacent binding post 72 that is carried by the insulated pedestal 73.

The post terminals 62—72 are connected to the two sides 63—74 of an electric circuit which is fed from any suitable source (e. g. such as the battery V); and when this circuit is closed by the switch r, the current will flow from the guide pulleys 48—48, etc., through the strand wire elements to the brush 68 and thence, through the tube 66 and its metallic bearing support 70, to the post connections 71—72. The portions of the strand wires extending from the pulleys 48, to their points of winding contact with the core or underbody, can thus be raised to any desired temperature by regulating the flow of current therethrough (e. g. by means of the rheostat R); and if it is desirable, or necessary to apply a different degree of heat to different wires this result can be effected by varying the resistance of the individual cells 51—51, etc.

The tension under which the strand wires are wound can also be nicely regulated and automatically controlled by the adjustment of the springs 38 and 40. The pull exerted on each strand wire at the point of winding—which determines the tightness, or the degree of initial pressure contact, with which the strand wire coils engage the core—tends to move the corresponding guide pulley 42 toward the associated guide pulley 43, and thus concurrently vary the preadjusted tensions of the springs 38, 39 and 40. Any momentary increase in this pull correspondingly increases the pressure on the spring 39 and the plunger brake block 36, and thereby tends to relieve the pressure of the latter on that portion of the strand wire which passes around the pulley 43 and thence to the pulleys 42—48. When the tension on the strand wire tends to decrease the reverse action takes place; and by properly adjusting the frictional resistance to the rotation of the strand wire spools 15, 15, 15, 15, and the resistance to the movement of each strand wire between the pulley 43 and the brake block 36; the tension of winding may be automatically maintained at a substantially uniform value over long periods without such hand adjustment as is necessary in other forms of shaft fabricating apparatus. It is further obvious that the preadjusted tension on each strand wire may, with this arrangement be individually and separately varied and controlled; so that different strand wires of the same group may, if desired, be wound under different tensions.

If the temperature, to which the strand wires are raised, is substantially below the critical annealing point (i. e. is substantially less than the "equiaxing" temperature for the material of which they are made), the heating of the wire, for the purpose of reducing the necessary winding tension, will not remove the beneficial effects of previous cold working—which are characteristic of the hard drawn wires ordinarily employed in the fabrication of flexible shafting—and in such cases the helically wound layer of material will, when cooled, retain the elastic properties which it must possess in order to produce a satisfactory product. But if the strand wires are heated to a very high temperature, and then allowed to cool slowly these properties will be lost. In order to avoid this difficulty, we provide means by which a very hot layer of strand wire may be immediately chilled, or "quenched", as soon as it is laid; thereby imparting, to such material as steel, a surface hardening or tempering that will substantially increase or improve its elastic and wear resisting characteristics.

In the construction shown in Figs. I to IIa, III and VI, the illustrative means provided for practicing this last mentioned feature of our improvements, comprise an inner perforated tube 75—which is detachably clamped in position, between the inner head 67 and the outer end of the tube 66, by means of the threaded collar 76—and two circulation conduits 77 and 78, which are connected respectively to the supply pipe 79 and the discharge pipe 80 in the bed B, and which are in communication (through the annular grooves 81—82 in the head 70, and the two rings of radial ports 83—84 in the tubes 66 and 75) with the outer and inner chambers formed by the concentric tubular members 66 and 75. When the control valve 85, in the conduit 77 is opened, fluid will flow from the supply pipe 79 through the port openings 81—83 into the outer chamber between the tubes 66—75, and will be discharged, in a series of jets or sprays, through a multiplicity of minute orifices 86—86, 87—87, etc., in the head 67 and the pipe 75, against the outer surface of the shaft section as it is drawn through the inner chamber. The cooling fluid, after having thus performed its intended function of suddenly chilling or "quenching" the hot layer of strand wire, is carried along toward the delivery end of the inner pipe 75—in part by the movement of the shaft body, and in part by the ejector action of the forwardly inclined orifices 87—87, etc.—and is there thrown out, by centrifugal action, through the ring of ports 84—84 into the groove 82, from which it is drawn away by the discharge conduit 78. In order to eliminate any possible danger of leakage at the two ends of the tube 75—through the orifices provided for the axial progression of the shaft section—the discharge conduit and pipe connections 78—80 may be directly connected to the suction side of a positive pump (e. g. the pump 88) that will establish and maintain a slight negative pressure—i. e. a pressure below atmospheric—in the inner chamber of the tube 75.

The shaft section which emerges from the delivery end of each winding unit, (e. g. the unit A'), will have the last applied layer of helical coils drawn down into close engagement with the underlying core body. As already stated the initial degree of pressure contact between these superimposed shaft elements can be reduced, and is reduced, by winding the strand wire elements in a heated condition; the pressure engagement will be subsequently increased by the cooling and contraction of the helical layer and it is therefore desirable that before this contraction the pressure engagement shall be as light as possible. Hot winding has a further important advantage in that there results from it a very material decrease in the unbalanced stresses, and unrelieved strains, that result from cold winding—i. e. from the excessive amount of cold work that is necessary to coil a hard drawn highly elastic wire about a core of relatively small diameter. The elimination—or better the initial avoidance—of such abnormal elastic distortion effects, is just as important, and in some cases even more important, in the manufacture of flexible shaft products, than is the reduction of the initial pressure engagement between the successively superimposed shaft elements.

In order to relieve, or in some cases completely eliminate, this initial contact pressure between the core or underbody of the shaft and each helical layer wound thereon—which results from the winding of the strand wires either cold or hot— we provide means for mechanically working and treating the shaft section immediately after each helical layer is applied, and before the succeeding layer is superimposed thereon. In the illustrative embodiment of our improvements, as herein shown and described, these means comprise a high speed rotary swaging, or swaging and rolling, unit (N), which is positioned close to the exit or delivery end of the associated winding unit A; and which is designed and adapted to "work" the shaft section which passes therethrough either hot or cold as may be desired.

In the form of construction shown in Figs. I–Ia, II–IIa, VIII, IX, X and XI, each of these swaging units comprises two heads, 90 and 91, which are respectively mounted on the shaft or trunnion supports 92—93 that revolve concentrically in a common bearing pedestal 94. The outer trunnion member 92 carries, at its forward end, a driving gear 95, and is connected, at its rear end, with the outer annular head 90, by four radially extending arms 96—96, etc. (as best shown in Fig. IX). This outer head comprises a continuous rim 97, and a web portion 98, on which four anvil block cages 100, 100, 100, 100, are detachably mounted, and which is also provided with two diametrically opposite bosses 101—101, that receive the two stud bolt bearing members 102—102. Each of the cage members 100 carries a reciprocable anvil block 103, which is provided with a lug 104, that projects through a slot in the outer face of the cage member and carries an adjustable stop screw 105 for limiting the inward radial movement of the anvil block; and the latter is normally held against its stop by a compression spring 106 which is interposed between the reciprocable member 103 and the inner end of a plunger 107 that is slidably mounted in the rim 97 of the outer head 90 but is prevented from rotating therein by a slot and pin connection 108. The outer portion of the plunger 107 is threaded to engage with a worm wheel 109, which is held in position between the rim 97 and a bracket 110 that is removably attached thereto, (as by the screws 111); and the teeth of this worm wheel member are engaged by a worm 112, whose shaft is rotatably mounted in the said rim, and which can be revolved by a star wheel, 113, that is attached to one end of the said shaft. A double bell crank lever 114 is pivotally supported on the pedestal frame 94 and is provided, at the opposite ends of its lateral arms with two pins 115—116, which are normally out of contact with the teeth of the star wheel 113, but which may be projected into the plane of these teeth by rocking the lever on its pivot support 117. In the normal position of the parts, each of these star wheels may be revolved by hand (when the head 90 is at rest) to thereby move the associated plunger member 107 radially, inwardly or outwardly, and thus independently vary or adjust the tension of the anvil block springs 106—106, etc; and when the head 90 is revolved all of the star wheel worm and worm wheel devices may be concurrently actuated, (to simultaneously vary the tensions of these springs), by rocking the lever 114 up or down so as to move one or the other of the two pins 115 or 116, into the line of circumferential movement of the star wheel teeth, and thereby rotate each of the said star wheels through one tooth space as it passes the engaging pin,—the direction of this rotation being determined by the position of the lever.

The inner head 91 is keyed or otherwise detachably secured to the rear end of its trunnion or shaft support 93; and is provided with four radial slots 120—120, etc., each of which is adapted to receive a reciprocating swaging die 121, whose inner end is so shaped, (as shown best in the enlarged view of Fig. XI) as to engage with the surface of the shaft on a line, or in a zone, offset from the axial line of reciprocation; or, stated in another way, in a zone which is eccentrically disposed to the radial plane of swaging die movement. The outer ends of the slots 120 are enlarged to receive the actuating rollers 122, which bear on the outer ends of the swaging dies 121, and which serve to drive these dies inwardly when the rollers engage with the spring pressed anvil blocks 103—103, etc. The outward movement of each of the cooperating roller-die elements 121—122 is independently limited, and adjustably controlled by a pin 123 which is revolvably seated in the head 91 and which is provided with a reduced eccentric portion 124 whose diameter is substantially less than the central opening in the roll 122 through which it passes. This pin is provided with a squared head by which it can be rotated so as to bring the eccentric element 124 into any desired position with respect to the associated roll 122 and thus govern the possible radial throw or recoil of the swaging die after it is driven inward by the engagement of the roll and anvil block members 122—103.

The die elements 121—122 are held in operative position in the head 91 by a cover plate 125, which is secured to the exposed face of the head by means of screws 126, and also by means of lock nuts 127 on the outer ends of the pins 123; and the removal of this cover plate permits these elements to be readily taken out and replaced by other swaging dies and rollers of different form or material, when such changes are deemed desirable.

The heads 90 and 91 are operatively interconnected by one or more pairs of spur gears, 130 and 131, which are keyed together and revolved as a unit on the stud bolt members, 102—102; and which engage respectively with a gear 133, that is pinned to the head 91 (or which may be keyed to the trunnion 93), and a gear 134 that is fixedly secured in the pedestal frame 94. When the outer head 90 is revolved, (e. g. by the rotation of the gear 95), the gear 131 rolls on the fixed gear 134, and the motion thus communicated to the connected member 130 drives the gear 133 (and with it the inner head 91) in the opposite direction to that in which the outer head 90 is rotating. In the illustrative construction here shown (Figs. VIII, IX and X) the diameters of the gear elements 134—131—130—133 are so proportioned that the speed of rotation of the inner head is about 2% greater than that of the outer head; so that at each revolution of the latter the instantaneous angular relationship of the two oppositely rotating members is shifted by about 7 degrees.

The driving mechanism for actuating the gear member 95 of each swaging unit comprises, a sprocket wheel 136 which is mounted to revolve freely on the stud bolt bearing 137; a spur gear 138 which is detachably secured to the hub of the wheel 136, and is adapted to engage the gear 95; a sprocket 139 that is driven by the jack shaft J; and a chain 140 which connects the two sprockets 136 and 139. In order to provide for varying the angular velocity of the swager heads, the stud bolt support 137 is mounted in an arcuate slot 141, whose center of curvature is the axis of the jack shaft; and by changing the size of the removable spur gear 138, and correspondingly shifting the position of the stud bolt bearing member 137 in this slot, so as to bring the gear 138 into operative engagement with the gear 95, the rotative speed of the latter may be varied within wide limits.

The simultaneous revolution of the two swager heads 90—91, in opposite directions and at substantially the same speed, substantially doubles the number of strokes delivered by the hammer dies—(as compared to the number delivered by the usual form of single head four die swager— e. g. such as is shown in the Angell copending application Serial No. 324,984, filed December 10, 1928—when the latter is revolved at the same speed)—and the introduction of a slight variation in the reverse speeds of the two heads, with a consequent continual procession or recession of the zones of impact about the axis of rotation, uniformly distributes the effect of the swaging action around the entire periphery of the axially moving shaft even when the latter is not rotated. The greatly improved action which may be obtained in this way may be illustrated by considering the case of an ordinary flexible shaft which is being fabricated at the usual speed of about 10 feet per minute (2" per second). The ordinary four jaw swager, running at a speed of 2400 R. P. M. (40 R. P. S.) will deliver 160 blows per second, and if the length of the swager dies is one-half inch each circumferential element of the moving shaft will receive, in its passage through these dies, 40 blows, that are all localized in four zones 90° apart. One improved swager, if run at the same speed, will deliver 80 blows on each circumferential element and these blows will be distributed around the periphery at angular intervals of about 7°, or less if desired;—the number of blows per unit length of the shafting, and the peripheral distribution of these blows on the surface of the helically wound outer layer, being each independently controllable (for any given speed of winding) by changing the size of the gear 138 (or of the sprocket wheel 136), and by altering the ratio between the pitch diameters of the two gears 130—133, (or 131 and 134).

The purpose and effect of using the particular form and arrangement of swaging die elements which are shown in Figs. VIII and XI—which are so shaped and disposed as to engage with the shaft surface in zones that are laterally displaced or offset from the radial planes of die movement—is to not only diminish the danger of locally distorting or indenting the helically wound coils at the points of impact; but is to also obtain a planishing or rubbing action, which cooperates with, and aids, the peening or hammering action, both in relieving such residual fabrication stresses as may be imposed by the winding operation (with either cold or hot strand wires), and also in expanding the inner diameter of the outermost or last applied layer relative to the underlying shaft elements, and thus relieving the initial pressure engagement between these parts. This last mentioned effect may be further augmented—with the form of swaging die construction now under consideration—by revolving the inner swaging head 91 in a direction opposite to that in which the outermost helical layer is applied by the preceding winding head. As shown in Fig. XI the eccentrically directed blow of each of the die members 121 tends to rotate the shaft body in the direction in which the engaging ends of these dies are offset from the center of the shaft; and if this direction of rotation is the opposite of that in which the outermost coil is wound—as indicated by the inner arrow $w$—the result of such movement will be to slightly uncoil or recoil the helical winding as it passes through and issues from the swaging dies, and thus aid, to that extent, the enlargement of the wound coils. The effect of this eccentric peening and planishing is obviously increased if the inner head 91, which carries the swaging dies 121—121, etc., is revolved in the direction of the offset action —i. e. in the direction indicated by the outer arrow, $y$, of Fig. XI—and since the direction of winding is preferably reversed in each successive layer, provision is made for correspondingly reversing, at will, the rotation of the swager units. In the arrangement here shown this reversal is accomplished by means of a supplemental gear 142 (indicated by dotted lines in Fig. VIII) which may be mounted in a stud bolt bearing 143, that is carried by the pedestal 94, in such position as to mesh with the gear 95; and when this supplemental gear is to be used, the stud bolt support 137 is moved down in the slot 141 to a point, (e. g. the point 137a), where the gear 138 is out of engagement with the gear 95 and in mesh with the supplemental gear 142.

The system of gears which we have provided for driving the various operative parts of our improved swaging apparatus enables us to obtain any desired, or desirable, ratio of relative angular movement between the two reversely rotating swager heads; and also permits these heads to be driven at any desirable speed, and in either direction, with respect to the associated winding head unit, or units; and, since the later units are also provided—as will be presently explained—with reversible and variable speed driving trains, each pair, or set, of winding and swaging instrumentalities may be operated at such interrelated speeds as will most effectively accomplish the desired results in the particular type or kind of product which is to be fabricated.

In most operations of the character here contemplated, it has been found most advantageous to subject the product to the mechanical swaging and planishing action of the units N¹, N², etc., while it is cold—i. e. at room temperature—because such "cold working" operations tend to improve the elastic properties of the material, and to restore the physical characteristics that may have been removed in part by the heating of the strand wire prior to winding. It has also been found that the beneficial effects of such "cold working" may be enhanced, in certain cases, by carrying on the operation in an intense magnetic field; and in order to provide for this we mount a powerful solenoid 145, on the cover plate 125 of the inner swaging head 91; and so construct and arrange the casing elements of this structure as to form, with the centrally disposed shaft section, a closed magnetic circuit for the lines of force generated by the exciting current in the solenoid. In order to most effectively concentrate the magnetic field in the swaging zone, the inner swaging head 91, and the cover plate 125, are made of bronze, or some other non-magnetic material, and the inner retaining head 146 of the solenoid cell is formed of like material. The cylindrical casing 147, and the outer head 148 of this cell, are made of soft steel or iron, or "permalloy"; and the inner end of the casing member 147 is provided with an outwardly and inwardly turned flange 149, which is cut away to expose the ends of the stop pins 123 and the lock nuts 127, and which is detachably secured to the head 91 by the screws 150. The inwardly turned portion of this flange 149 is also preferably provided with four bosses 151—151, etc., which are seated in openings in the face of the cover plate 125, and whose ends lie in close proximity to the adjacent faces of the swaging dies 121—121, etc. The casing 147 carries two insulated collector rings 152—152, which are connected to the terminals of the solenoid coil and are engaged by the brushes 153—153, that are mounted on a lateral extension of the adjacent pedestal 73. Current is conducted to these brushes from any suitable circuit, V', (as diagrammatically indicated in Fig. II), and is regulated in volume by an adjustable rheostat or transformer R⁹ so as to vary and control the resultant strength of the magnetic field. It is apparent that the casing members 147—148—151—151, etc., the steel swaging dies, 121—121, etc., and the shaft section S—S, extending from the first to the last of these members, form a substantially closed path (save for the small gap between the casing projections 151—151 and the dies 121—121) for the lines of force generated by the exciting current in the coil 145; and that the field thus created in the zone of "cold working" (swaging) action may, if desired, be brought to the point of magnetic saturation of the shaft material.

The removal of the end casing plate 148, which is detachably secured to the casing member 147, and which forms, in conjunction with the spool or bobbin element 146, the support for the solenoid coil 145, permits the latter to be readily slipped out and replaced by another element carrying a different winding; and by removing the four screws 150—150, etc., all of the assembled parts, 146—147—148 * * * 152, etc., may be detached from the cover plate 125, without disturbing any other portion of the swaging mechanism. The latter may therefore be used to perform its desired functions, either with or without the accessory device last described; and the latter may be brought into, or put out of, action, at any time while the fabrication is proceeding, by closing or opening the electric circuit through the solenoid coil 145.

If the layer of strand wire which is applied by any one of the winding heads A¹, A², A³, or A⁴, is wound at a high temperature—i. e. a temperature substantially above the critical annealing point of the strand wire material—and is afterwards quickly quenched by the use of the cooling tube unit previously described (see Fig. VI), the resultant surface hardening or tempering of the strand wire layer may in some cases make it desirable to reheat this wire, before and (or) during the swaging operation. We provide for such reheating by passing a current of regulable volume through the portion of the shaft which extends from the pedestal 73 to a point just beyond the zone of swaging action; i. e. from the sliding contact 155, which is connected to the post 72, to the flexible brush 156, which is mounted on an insulated bushing in the end of the shaft 93, and is connected to an insulated collector ring 157 on the hub of the head 91. The ring 157 engages a sliding contact 158, which is carried by the swager head 91, and which is electrically coupled to a second collector ring 159 on the outer periphery of the said head; and this last mentioned ring is engaged by a stationary brush 160 on the pedestal 94. The brush 160 is connected, through the switch r₂ and the adjustable resistance R₂, to the battery or generator main (63) that leads to the post 62; and by regulating the current flow in the last described circuit, 72—155—156 * * * 160—63, the shaft section extending between the contacts 155—156 may be heated to any desired temperature during the swaging operation.

When the above described apparatus is used in the last described manner, to "hot swage" the strand wire layer, it may be desirable to again quickly cool or "quench" the heated metal as it leaves the working zone; and this may be done by providing a cooling tube unit 66a, which is of the same general construction as that shown in Fig. VI, and which is mounted in, and revolves with, the trunnion shaft 93. The cooling fluid is introduced to, and drawn from, the concentric chambers of this cooling tube, through stationary head and pipe connections 70a—77a—78a, that lead to the supply and discharge conduits 79 and 80, in the bed of the apparatus; and the flow of this fluid is effected and controlled, by the aid of the valve 85a, in the manner previously described.

Figs. XII, XIII, XIV, XV and XVI illustrate an alternative form of swaging mechanism which presents the general features of construction and operation that characterize the structure shown in Figs. VIII to XI inclusive; but which differs therefrom in certain details which will be briefly described. This second form of swaging unit—which may be substituted for any one, or all, of the units N¹, N², N³, or N⁴—also comprises two revolvable heads 90a and 91a, which are respectively mounted on the concentric shaft or trunnion members, 92a—93a, and which are rotatably supported in a common pedestal bearing 94a. The two heads, 90a—91a are, in this case, interconnected by a pair of transmission pinions 162—162, which are mounted to revolve freely on stud bolt supports 163—163, that are carried by the outer head 90a; and which are concentrically engaged by an outer annular ring gear 165, affixed to the stationary pedestal bearing member 94a, and by central spur gear 166, that is keyed or otherwise secured to the inner head and trunnion members 91a—93a. The inner trunnion shaft 93a is provided with a gear wheel 95a, which is driven from the jack shaft, J, by the sprocket wheel and chain connections 136a—139a—140a, and by the associated spur gears 142a and (or) 138a, that are rotatably supported on the pedestal 94a by the respective stud bolt bearings 143a and 137a. The rotation of the gear 95a—and of the head 91a which is driven thereby—acts, through the planetary gear system 166—162—165, to rotate the outer head 90a in the same direction, but at a substantially lower speed; and the revolution of the jack shaft J in any one direction, say clockwise, will revolve the inner head in the same direction—viz. clockwise—as it is rotated by the system of gear connections shown in full lines in Fig. VIII. In order to reverse this direction of rotation we provide a second stud bolt hole 167, in the pedestal frame 94a; and by shifting the stud bolt 137a, from the full line position shown in Figs. XII and XIV, to the hole 167, and then removing the pinion 142a, the gear 95a may be driven directly from the gear 138a.

As has just been indicated the operation of the planetary gear system 165—162—166, differs from that of the system 134—131—130—133 previously described (Figs. VIII to X) both as to the relative direction of rotation, and as to the relative angular velocity, of the outer and inner swager heads. In the last described arrangement these two heads always revolve in the same direction; and with the particular diameters of gears shown in Figs. XII and XIV the central members 91a—93a are driven at a speed which is about 3½ times that of the outer member 90a. In consequence of this there is a continuous procession of the inner head, which amounts to approximately thirty degrees, (30°) at the end of each complete revolution of the outer head.

In the construction now under consideration the outer head is provided with six anvil block members—each of which is substantially identical with those shown in Figs. VIII, IX and X—but the inner head carries only two sets of swaging die members, which differ, in some respects, from those previously described. Each of these swaging die members comprises a pair of hammer elements, 170 and 171, which are mounted side by side in a radial groove 172, that is formed in the face of the head 91a; and a reciprocable block, 173, which is also positioned in this groove, in engagement with the outer ends of the said elements (170—171), and is limited in its radial movement by an eccentric stop pin 123a—124a similar in all respects to the corresponding numbered parts shown in Fig. X;—these cooperating members being all retained in position by a cover plate 125a that is detachably secured to the outer face of the head 91a. The aggregate width of the two dies, 170 and 171, is somewhat less than that of the groove 172; and their contiguous faces are normally held in contact with each other by a pair of opposing springs 175—175, whose tension can be independently adjusted and controlled by the recessed set screws 176—176 etc.

Each complete revolution of the inner head 91a brings each of the hammer blocks 173 into contact with four of the spring pressed anvil blocks 103a on the outer head 90a, (which has concurrently rotated through 110°); and thus results in the delivery of eight impact blows on the surface of the shaft, at intervals of approximately 90° therearound. In the next revolution the areas of impact on the shaft surface are shifted about 10°; and at the completion of nine revolutions of the inner head (or three of the outer) this surface has been subjected to swaging action on substantially its entire periphery; the relative speeds of the winding head and of the swager heads being, of course, so adjusted that the linear or axial movement of the fabricated product does not exceed the length of the die edges in this number of revolutions. If the winding head is revolving at a speed of 1800 R. P. M. and is delivering a wound product at the rate of 2″ per second; and if as previously assumed, the thickness of the swager dies is ½ inch (0.5″) the necessary speed of the inner swager head, to effect this result, is 2160 R. P. M. Since the inner head is much lighter than the outer head it can be safely run at a much higher speed than that just mentioned; and the swaging effect can, if desired, be materially intensified by the use of such higher speeds.

The functional action of the die elements used in this second form of swaging apparatus is slightly different from that of the corresponding dies 121. The zones of engagement between the dies, 170—171, and the surface of the shaft S, are as before, offset in both directions from the center of the shaft, so that the die edges, when driven into contact therewith exert both a peening action, and a planishing or rubbing action thereon. This planishing effect is accentuated, and the radial force of the hammer blow is softened, by the yielding of the springs, 175—175, etc., which permits the two halves of each die, 170—171, to separate as they engage the shaft—as shown in Fig. XVI—and slide laterally over its surface. But this action is symmetrical with respect to the axis of the fabricated product; and there is not, therefore, in this case any tendency to rotate the latter, unless the two opposing springs 175—175 of each double die are of unequal tension, or unless the ends of the twin elements 170—171 are so shaped that they engage the shaft at unequal distances from the median plane,—as illustrated, for example, in Fig. XVII.

It is sometimes desirable to supplement, or complement, the effects of the swaging and planishing operations—and to also increase the untwisting or recoil action that may result from the use of such die elements as are shown in Figs. XI and XVII—and we have therefore provided a rolling mechanism which can be attached, whenever desired, to the exit or discharge end of either the trunnion shaft 93 (or 93a), or to the cooling tube 66a that is carried thereby. This rolling attachment is illustrated in detail in Figs. XVIII and XIX, and comprises an annular cage 177, which is bored out to receive three rolls 178, that are retained in position against its inner flanged end 179, by a removable head 180. Each of these rolls is provided with trunnion extensions 181, which project through, and revolve freely in, short slots 182 and 183 that are formed in the head 180 and the cage flange 179. The projecting portions of these trunnion members are coned or bevelled, and are engaged by the inturned flanges 184 and 185 of two cup shaped sleeves 186 and 187 which are concentrically mounted to slide freely, one within the other, but are held against relative angular movement by the projecting lugs, 188, that are attached to the inner sleeve 187 and project outwardly through slots in the surrounding sleeve 186. The flange members, 184 and 185, are held in elastic engagement with the coned ends of the trunnions, 181—181, by a compression spring 190, which is interposed between the lugs 188—188, etc., and an adjustable nut 191, on the opposite end of the outer sleeve 186, and which serves to maintain an equalized inward pressure on the three rolls 178—178—178.

The spring 190 is covered by a guard tube 192 which is secured, at one end, to the lugs 188—188, and is slidably engaged at the other end, with the nut 191.

The reduced end of the cage member 177—179 is secured to a threaded collar 193, which may be so formed as to screw into the outer end of the cooling tube 66a (when the latter is used) or into the end of the trunnion shaft 93 (or 93a) when the said tube is removed. When so connected the roll cage 177 will be rotated about the axis of the shaft at the same speed, and in the same direction, as the inner swager head 91a is revolving; and if there is no substantial restriction on the free movements of the interengaged elements, 177—178—181—184—185—186 and 187, the spring pressed members 178—178—178 will roll around on the surface of the shaft, without exerting any material tendency to rotate or twist the latter. But if the revolving surface of the outer guard tube 192, is subjected to a very slight retarding force—e. g. by applying a very small tension to the primary or toe end (not the heel end) of a flexible band brake 194—the moving roll system will begin to act like a planetary gear and will tend to rotate the shaft, S, in the same direction in which the connected elements 93 (or 93a) and 177, are rotating. When this rotation is in the direction of the arrows y of Figs. XI and XVII—i. e. in a direction opposite to that of the last winding, w—the twisting or turning effect last described will cooperate with that produced by the "offset" swaging, in partially uncoiling or recoiling the helically wound outer layer; and thereby assisting the peening and planishing action, both in releasing or eliminating residual stresses and strains in the shaft elements, and also in reducing or relieving the initial pressure engagement between the core body and the strand wire coils wound thereon.

It will now be apparent that the rolling attachment last described—which may be used at the option of the machine operator—can be employed to effect merely a compressing and smoothing action, that will tend to iron out any minute irregularities of surface produced by the swaging operation; or it can be utilized to produce a graduated and controllable recoil action which may be nicely adjusted, while the machine is in operation, by varying the retarding or braking effect on the sleeve assemblage 184—185 * * * 192.

As each shaft section, which is produced by the passage of the product through one of the winding units (e. g. A¹), is passed, in turn, through the associated swaging unit (e. g. N¹),—where it is subjected to a peening and planishing action (either hot or cold), or to an electromagnetic cold working operation, or to a rolling and smoothing action, or to a recoil action, or to two or more of these operations in sequence—it is engaged by a draft unit (e. g. M¹), which is designed to exert a continuously controlled axial tension on the moving shaft, and to draw the latter through the preceding winding and swaging units at a speed which will effect a uniform spacing of the helically wound strand wires. As shown in Figs. I—IIa and XXI, each of the draft units M¹, M² and M³, comprises a horizontal capstan drum 195, around which the shaft is passed one or more times, and which is rigidly secured to but insulated from a worm wheel 196 that is revolvably supported on the vertical stud bolt bearing member 197; a worm 198, which engages with the worm wheel 196, and which is carried on the shaft 199; a bevel gear 200 which is secured to the shaft 199 and meshes with a pinion 201, that is secured to a vertical shaft 202; a friction disc element 203 which is splined to, but is axially movable on, the shaft 202; and a cooperating disc, 204, which engages the edge of the disc 203, and which is itself driven from the jack shaft J through the medium of a variable speed gear drive K—L. Each of the disc members 204, is secured, on one side, to a sprocket pinion 139, which forms part of the swager gear train, (already described), and, on the other side, to a second sprocket pinion 205 which forms a part of a winding head gear train; so that each one of the last three variable speed drives, K—L, serves to concurrently actuate three successively arranged units N¹—M¹—A², N²—M²—A³, or N³—M³—A⁴, (see Figs. I to IIa).

The variable speed gear drive K—L comprises a bevel pinion 206, which is keyed to the jack shaft J; a second bevel pinion 207 which is secured to the sprocket pinion 205, and which revolves freely on the shaft J; a pair of idle pinions 208, which connect the two gears 206 and 207, and which are mounted on arms carried by the worm wheel 209 (that also revolves freely on the jack shaft J); a worm 210 which engages the worm wheel 209, and which is mounted on the shaft of a reversible and variable speed motor L. When the motor is at rest, the gear 206 will drive the gear 207 at the same speed but in the opposite direction;—the axes of the transmission gears 208—208 being held in fixed position by the engagement of the worm and worm wheel elements 209 and 210—but when the motor L is rotated, the angular velocity of the driven gear 207 will be either increased or diminished (as determined by the direction of motor rotation), by an amount which is governed and controlled by the speed of the said motor.

This change in the speed of the four unitarily connected gear members 207—205—204 and 139, results in a simultaneous variation in the angular velocity of the associated swager heads 90—91 (or 90a—91a), and of the draft capstan 195, and of the next winding head unit; and this concurrent alteration of speed can be effected at any time while the apparatus is in operation, and will be sufficient to take care of any desired change in the relative speed of winding and swaging the second, third and fourth, layers of strand wire (by the units A², A³ and A⁴). But in addition to these concurrent variations in the speed of all of the units of the three groups N¹—M¹—A², N²—M²—A³, and N³—M³—A⁴, we have also provided for independently and separately varying the speed of each unit of this complete combination as follows: The angular velocity of the swager heads 90—91 (or 90a—91a) can be altered by changing the size of the gear elements 138 (or 138a) of any of the swager gear driving trains (as already explained): The rate of rotation of any draft drum, 195, can be varied by shifting the friction disc 203 up or down on the shaft 202 (which may be effected by the use of the bell crank lever 211 and the manually operable hand wheel 212): In order to independently control the speed and the direction of rotation of the several winding units, we provide each of these units with a secondary driving shaft J₁, which is connected to the sprocket 205 by means of the sprocket 215 and the chain 216; and which is connected to the pinion 13, on the winding head trunnion 9, by means of the gears 217, 218 and 219. The gears 218 and 219 are each mounted on stud bolt supports, which may be moved up and down, and clamped in any position, in the radial slot 220, of an adjustable arm 221. Either (or both) of the gears 13 or 217 may be readily removed and replaced by another (or others) of different size; and when this is done—and the position of the transmission elements 218 and 219 is readjusted to effect the necessary connection between the said gears—the winding head may be driven at any desired speed; and its direction of rotation may also be readily reversed by removing one of the transmission elements 218 or 219.

The first winding head $A^1$ is not directly interconnected with the other units of the apparatus but is provided with a driving train which is similar, in all respects, to the one just described; and which is actuated from the jack shaft J through the intervention of another variable speed mechanism K—L. The motor (L) of this particular mechanism may be independently controlled—like the corresponding motors of the succeeding group actuating mechanisms—or it may be coupled in series with the next motor (of the unitarily regulated group $N^1$—$M^1$—$A^2$) so as to obtain a concurrent and simultaneous variation in the speed of the first and second winding units.

The construction of the final draft unit $M^4$, is somewhat different from that of the preceding units, $M^1$, $M^2$ and $M^3$ and the speed control for this terminal member of the fabricating apparatus is not connected with that of any of the other units of the combination. The unit $M^4$ comprises a large horizontal capstan drum 195a, which is bolted to, but insulated from, a large spur gear 225 that is mounted to revolve freely on a pedestal support 226. This gear is engaged by a small pinion 227, which is secured to a second large gear 228; and this gear is engaged, in turn, by another pinion 229 which is keyed to the upper end of a vertical shaft 230. The shaft 230 carries a large heavy disc 231, which rests on, and is driven by, a small friction gear element 232, which is splined on the jack shaft J; and which may be adjusted in position on this shaft—radially of the disc 231—by means of the shift lever 233. The disc 231 is preferably connected to the shaft 230 through the medium of a torsion spring 234; and by shifting the position of the friction gear element 232 on the jack shaft J, the torsional twist in the spring 234, and the resultant pull on the fabricated shaft at the delivery end of the machine, may be varied and controlled, at the will and in accordance with the judgment of the machine attendant.

After leaving the final draft unit $M^4$ the fabricated shaft is passed through a pair of guide rolls 235—236, and a pivoted guide tube 237, and is wound on the take-up spool D, which is operatively coupled to the jack shaft J by the train of reduction gears 238—239—240 and 241, the double universal joint and inclined shaft connections, 242—243, and the usual train of reel driving mechanism which is commonly employed in this art, and which need not, for that reason be explained in detail.

In the operation of our apparatus, the central core body—which may be either a single wire or a plurality of wires arranged in any desired relationship—is drawn from the pay-off reel C; and the successively formed sections of the fabricated product are progressed continuously through the several groups of winding and swaging units, $A^1$—$N^1$, $A^2$—$N^2$, etc., by the cooperative action of the draft mechanisms $M^1$, $M^2$, $M^3$ and $M^4$, each of which may be adjusted, as already explained, to exert any desired predetermined tension on the section of shaft with which it is engaged. In order that this adjustment may be most effectively utilized, in securing a uniformly wound product, it is desirable to also provide means whereby the back pull on the central core element may also be regulated, and maintained at any preadjusted value. This result may be accomplished by the use of the automatic tensioning mechanism shown in Figs. I and II, which comprises a brake drum 244, around which the core body is wrapped one or more times, a weighted pulley 245 that engages the said core between the point where it leaves the drum 244 and the point where it passes over the direction pulley 246 and enters the first winding unit $A^1$, and a magnetically actuated brake 247 whose action is controlled by the up and down movement of the pulley 245. This control may be effected in various ways; but as here illustrated it is obtained by interposing two rheostats $R^{10}$ and $R^{11}$ in the circuit of the brake solenoid and connecting the movable contact 248 of one of these rheostat elements (e. g. $R^{11}$) to the swinging arm that carries the weighted pulley 245.

In using this device the weights 249 and 250, are adjusted to impose the desired tension or back pull on the section of core wire which passes around the pulleys 245 and 246 to the first winding unit $A^1$, and the rheostat $R^{10}$ is manually regulated so that the pulley 245 will normally ride in the intermediate position shown in Fig. II. If the resistance to the withdrawal of the core body from the pay-off reel C is increased, (e. g. by the gradual decrease in the diameter of the spool of wire, or by an increase in the frictional resistance to rotation of the said reel), the pulley 245 will rise, and will move the contact 248 in such direction as to augment the resistance of the rheostat $R^{11}$ and decrease the current through the solenoid of the brake member 247. This will permit the brake drum 244 to revolve more easily and permit the pulley 245 to return to its normal position. If the resistance to the movement of the reel C is decreased—so as to permit the core body to pay off at a too rapid rate—the pulley 245 will fall and the reverse action will take place.

It is believed that the various characteristic features of our improved mode of procedure for fabricating flexible shafting; and of the mechanisms which we have described for practising these improvements; will now be understood without further extended explanation. Very generally stated the features of procedure which we consider as novel and useful, are: the "hot winding" of the strand wire layers on a core which is usually cold but which may also be heated—for the purpose of very substantially diminishing the force required to bend and coil these wires around the relatively small core body, and thereby reducing the stresses and strains imposed on the strand wire material during such winding operations—; the immediate chilling or "quenching" of the hot wound strand wires, (if they are heated above the critical annealing temperature)—with the object of improving their physical characteristics—; and the subsequent mechanical "working" of each layer, (by swaging, planishing and (or) rolling under controllable thermal and magnetic conditions)—for the purpose of releasing or reducing the residual stresses and strains that may remain in the material when the temperature of winding is relatively low, and of relieving the initial pressure engagement of the said layer with the underlying core body—before the next layer is wound thereon; the general object of these combined operations being to produce a finished product which will not "kink" or "curl", when it is cut up into short lengths; which will not uncoil or untwist so as to make the outer layer unduly loose when the end restraint thereon is removed; which will not "whip" or "jump" when rotated in a bent or curved condition; which will be sufficiently free from internal friction to permit it to be used effectively—i. e. without material loss of energy, or undue wear—for power transmission purposes; and which will have sufficient torsional strength or stiffness to avoid excessive elastic "lag", or "lost motion", under varying degrees of torque application. Our improved procedure is particularly designed and adapted to produce, in one continuous or uninterrupted operation, a shaft having all of these desirable characteristics.

The correlative features of our improved mechanical organization, here disclosed as one means of performing the several steps above outlined, are: the instrumentalities for heating each strand wire to a definite temperature just prior to its application to the core body, and for establishing any desired relation between the temperatures of different strand wires either in the same or in different layers; the devices for preadjusting and automatically maintaining a predetermined tension on the strand wires during each winding operation—it being possible to adjust and if desired, independently vary the tension on each wire, in accordance with the conditions of winding; the means for directing and controlling a forced flow of cooling fluid against the surface of the hot wound layer of strand wire elements as they pass from the region of winding; the means for subjecting each successively wound layer of strand wire to a special swaging—i. e. to a combined peening and planishing action—at either normal room temperature or at a higher temperature—; the devices for altering the intensity or effect of this swaging action, without interrupting the operation of the machine; the means for creating and maintaining a magnetic field, of any desired intensity, at the points or zones of swaging; the cooperative instrumentalities for further subjecting the swaged layer to either a rolling and smoothing; or to a controllable recoil, action; the mechanisms for applying an independently regulable degree of axial draft or pull on the core body and on each successively assembled portion of the complete shaft; the means for varying the rotative speed of the winding heads, and of the draft mechanisms, either separately or conjunctively, while the fabrication is proceeding; and various other associated and correlated elements of construction which contribute to the attainment of the objects and results of our present improvements.

Having thus described our invention, we claim:

1. An improvement in the art of fabricating flexible shafting which comprises the continuous progression of a core body and the winding thereon at a pitch angle of less than 45° to a line transverse to the axis of the core body, of a helically coiled layer of strand wires heated to a temperature sufficient to reduce the winding tension and lessen the bending stresses of the helix.

2. An improvement in the art of fabricating flexible shafting which is composed of a core body, and a plurality of strand wires wound thereon at a pitch angle of less than 45 degrees to a line transverse to the axis of the core body, which comprises the step of heating the said strand wires prior to and during their application to the said core to a temperature sufficient to reduce the winding tension and lessen the bending stresses of the helix.

3. An improvement in the art of fabricating flexible shafting which comprises the successive steps of heating a strand wire, winding the said heated wire on a core body at a pitch angle of less than 45 degrees to a line transverse to the axis of the core body, and then subjecting the wound layer of wire to a mechanical working to thereby relieve unbalanced stresses and strains therein.

4. An improvement in the art of fabricating flexible shafting which comprises the steps of winding a layer of strand wire on a core body and subjecting the said strand wire to a predetermined constant tension at the point of its application to the said core.

5. An improvement in the art of fabricating flexible shafting which is composed of a core body and a plurality of strand wires wound thereon, which comprises the steps of heating the said strand wires before and during the winding procedure, and of subjecting the said heated wires to a predetermined uniform tension at their points of application to the said core.

6. An improvement in the art of fabricating flexible shafting which comprises the winding of a helically disposed layer of strand wire on a core body, and then subjecting the said layer of strand wire to the simultaneous action of a magnetic field and of intermittently applied and rapidly recurrent mechanical stresses.

7. An improvement in the art of fabricating flexible shafting which is composed of a core body and a layer of helically coiled strand wire wound thereon, which includes the step of subjecting a material portion of the surface of the said layer to a uniformly distributed peening and planishing action to thereby alter the inner diameter of the layer with respect to the underlying body.

8. An improvement in the art of fabricating flexible shafting which consists in first winding a helically disposed layer of wire on a central core, and then altering the diameter of the said helical winding by subjecting the outer surface thereof, to a succession of eccentrically directed impact stresses whereby the initial pressure engagement between the core and the helix is reduced.

9. The method of fabricating flexible shafting substantially free from internal friction which comprises, the winding of a helically disposed layer of wire on a central core body, and then relieving the initial contact pressure between said layer and said core by subjecting the wound layer to a rapidly recurrent series of light impact stresses which are exerted along lines eccentric to the central axis of the body.

10. An improvement in the art of fabricating flexible shafting in continuous lengths, which comprises the concurrent winding of a plurality of radially superimposed layers of helically disposed strand wire elements about a central core body, and subjecting each layer, after it is wound but before another layer is superimposed thereon, to combined peening and planishing actions, to thereby relieve the stresses and strains imposed on the material during the winding operation, and concurrently decrease the initial pressure engagement between said layer and the underlying shaft elements.

11. An improvement in the art of continuously fabricating flexible shafting which comprises the concurrent winding of a plurality of radially superimposed strand wire layers about a central core body, and subjecting each of the said layers in turn to the combined action of a magnetic field and of a rapidly recurrent series of intermittently applied impact stresses, whereby the unbalanced strains induced by the winding operation and the initial pressure contact between the said layer and the underlying shaft elements are relieved prior to the winding of another layer thereon.

12. An improvement in the art of fabricating flexible shafting in continuous lengths which comprises the winding of a helically disposed coil of strand wire on a central core body, subjecting the said coil to a combined peening, planishing and recoil action to thereby relieve the initial pressure contact between the said coil and the said core and to concurrently reduce the unequalized stresses and strains induced by the coiling operation, then winding another superimposed layer of strand wire on the mechanically treated underlayer, subjecting this next applied layer to another combined peening, planishing and recoil action, and continuing the operations until the fabrication is completed; all of these conjoint winding and mechanical working operations being carried on concurrently and in immediate sequence while the core and shaft elements are being continuously progressed under a predetermined difference of tension between the said elements on the opposite sides of each winding zone.

13. An improvement in the art of fabricating flexible shafting which comprises the continuous progression of a core body and the winding thereon while it is cold of a helically coiled layer of heated strand wire.

ROBERT C. ANGELL.
FRANK L. O. WADSWORTH.